United States Patent [19]

Pione

[11] Patent Number: 4,611,273
[45] Date of Patent: Sep. 9, 1986

[54] SYNCHRONIZED MICROSEQUENCER FOR A MICROPROCESSOR

[75] Inventor: Anthony E. Pione, Manassas, Va.

[73] Assignee: International Business Machines Corporation, Armonk, N.Y.

[21] Appl. No.: 567,035

[22] Filed: Dec. 30, 1983

[51] Int. Cl.[4] .......................... G06F 9/22; G06F 9/26; G06F 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,050,713 | 8/1962 | Harmon | 340/172 |
| 3,221,188 | 11/1965 | Bozeman | 307/88.5 |
| 3,267,303 | 8/1966 | Meyer et al. | 364/900 |
| 3,586,985 | 6/1971 | Schoendorff | 382/61 |
| 3,725,793 | 4/1973 | Phillips | 328/63 |
| 3,932,847 | 1/1976 | Smith | 364/200 |
| 3,972,024 | 7/1976 | Schroeder et al. | 364/200 |
| 4,021,784 | 5/1977 | Kimlinger | 364/200 |
| 4,203,030 | 5/1980 | Moran | 235/92 CC |
| 4,313,159 | 1/1982 | Shoap | 364/200 |
| 4,333,159 | 6/1982 | Bigall et al. | 364/900 |
| 4,345,316 | 8/1982 | Hirotani et al. | 364/900 |
| 4,367,524 | 1/1983 | Budde et al. | 364/200 |
| 4,395,758 | 7/1983 | Helenius et al. | 364/200 |
| 4,428,047 | 1/1984 | Hayn et al. | 364/200 |

Primary Examiner—James D. Thomas
Assistant Examiner—William G. Niessen
Attorney, Agent, or Firm—John E. Hoel

[57] ABSTRACT

A high speed, integrated circuit microprocessor includes a microinstruction sequencer for sequentially generating a plurality of N control words per period, each control word having a plurality of M bits. The microsequencer includes a storage register in the integrated circuit, having a plurality of M times N storage locations, for storing a microinstruction containing the N control words. The microsequencer also includes an N bit shift register in the integrated circuit, having N sequential outputs and a clock input with a cycle time equal to 1/N of the period, for propagating a binary bit therethrough to sequentially provide an enabling bit to each of the respective N outputs thereof. A plurality of M logic stages is also included in the integrated circuit, each stage including a plurality of two-input N AND gates. An $i^{th}$ one of these N AND gates in each stage has a first input connected to an $i^{th}$ one of the N outputs of the shift register and a second input connected to a respective one of the M control bits in a respective one of the N control words of the microinstruction stored in the storage register. In operation, by propagating a binary bit along the N bit shift register at the faster clock rate corresponding to 1/N of the period, the plurality of N of the control words can be sequentially output during the period. The circuit finds particular advantage in accelerating the rate at which control words can be sequentially output to a high speed processor from a control storage in the integrated circuit, having a relatively slower access time corresponding to the longer period.

12 Claims, 14 Drawing Figures

MULTIPLIER 12

ADDER 14

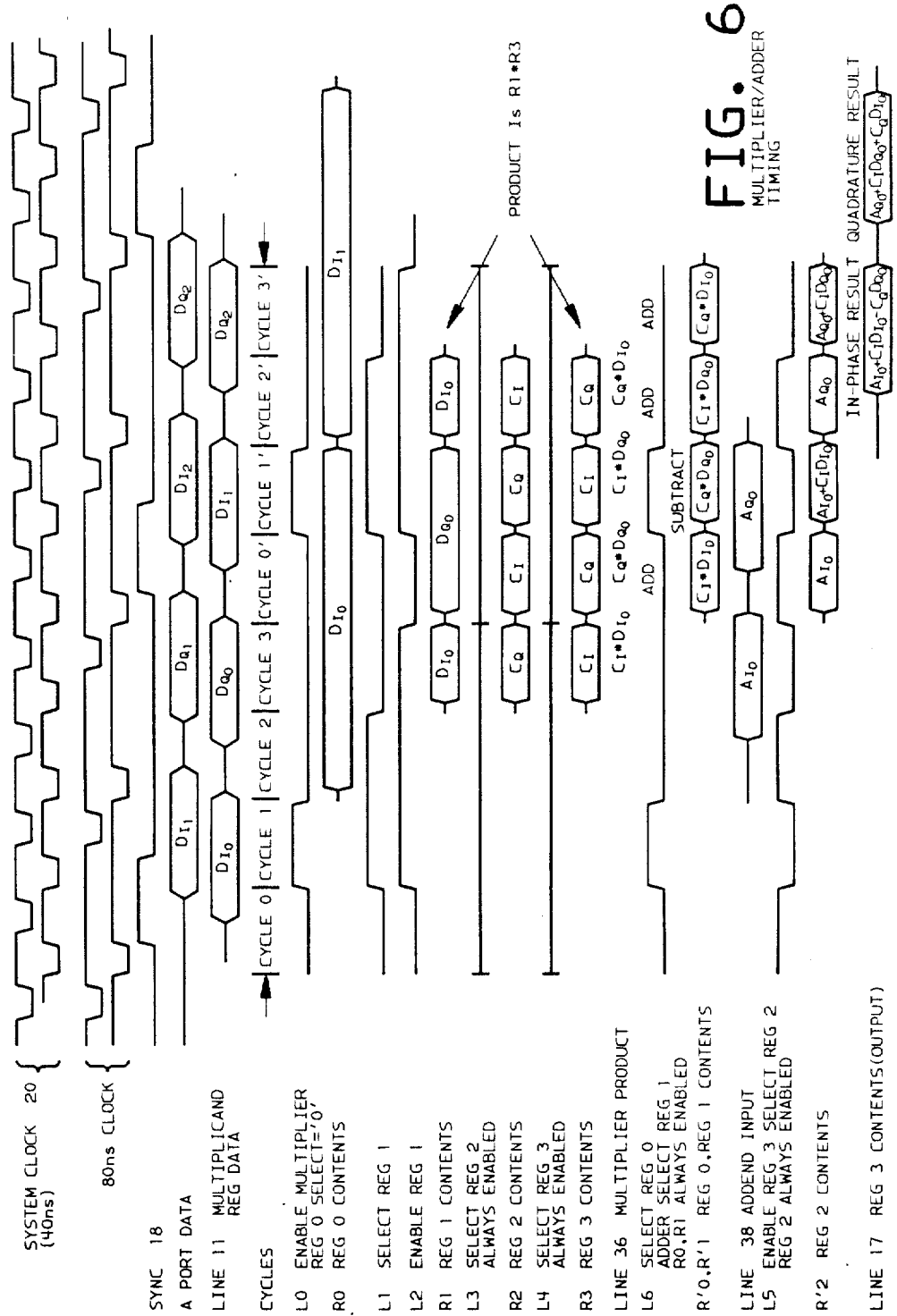

SYNCHRONIZED MICROSEQUENCER FOR A MICROPROCESSOR

DESCRIPTION

Field of the Invention

The invention disclosed broadly relates to data processing hardware and more particularly relates to an improved control technique for a microprocessor.

BACKGROUND OF THE INVENTION

Single chip microprocessors have been increasing in their basic clock rate so that a 25 MHz clock rate is no longer considered unusually high. During each consecutive clock cycle, a different step in the arithmetic functions performed by the microprocessor is carried out. Microinstructions consisting of a word containing multiple binary bits, are consecutively applied to the control input of the arithmetic logic in a microprocessor, one word for each consecutive cycle of arithmetic operation. These microinstructions must be read from a microinstruction storage unit such as a writable random access memory or a read only memory which is capable of an access cycle time which is at least as fast as the arithmetic cycle time for the arithmetic logic of the microprocessor. Thus, for arithmetic logic operating at a 25 MHz rate, a 40 nanosecond access cycle time is required in order to read consecutive words from the microinstruction storage. Although bipolar transistor writable random access memories are available which are capable of such short access cycle times, it is difficult to fabricate a field effect transistor writable random access memory on the same integrated circuit chip with the arithmetic logic of the microprocessor, which is capable of sustaining such short memory access cycle times.

OBJECTS OF THE INVENTION

It is therefore an object of the invention to provide an improved control mechanism for a microprocessor.

It is still another object of the invention to provide an improved control mechanism for an FET microprocessor.

It is still a further object of the invention to provide an improved control mechanism for a field effect transistor microprocessor where the instruction storage is located on the same integrated circuit chip as the arithmetic logic for the microprocessor.

It is still a further object of the invention to provide an improved means for sequentially accessing control words for a microprocessor.

It is yet a further object of the invention to provide an improved means for branching from a first sequence of control words to a second sequence of control words in a high speed microprocessor.

SUMMARY OF THE INVENTION

These and other objects, features and advantages of the invention are accomplished by the synchronized microsequencer apparatus disclosed herein. A high speed microinstruction sequencer is disclosed in the subject disclosure, for generating N control words per control memory cycle, each control word having M bits. The arrangement employs an N bit shift register having N sequential outputs and a clock input with a periodic clock pulse having a cycle time of 1/N of the control memory period. The N bit shift register propagates a binary 1 bit through it to sequentially provide an enabling signal to each of the respective N outputs. There are M logic stages, one stage for each binary bit in the control word. Each of the stages includes N AND gates. Each of those AND gates has a first and second input, with the $i^{th}$ one of the N AND gates in each stage having a first input connected to the $i^{th}$ one of the N outputs of the shift register, so that during each shift register clock cycle time, one of the AND gates in each stage is enabled. Each of the AND gates has a second input connected to a respective one of the M control bit outputs of a respective one of the N control words stored in each addressable column of the control storage. In operation, once during each control storage cycle period, a microinstruction having N control words is read out. Each of the M bits in a given control word is input to a separate one of the AND gates in each of the M logic stages. For example, if four control words of eight bits each were read from the control storage every 160 nanoseconds, and there are eight logic stages, each stage having four AND gates each of the eight bits from a given control word would be input to one of the four AND gates in each of the eight respective logic stages, for a total of 32 binary bit inputs one for each of the 32 AND gates. The cycle time for the four bit shift register is then 40 nanoseconds per stage, so that during the first 40 nanosecond interval, a first one of the four AND gates in each of the eight logic stages is enabled, thereby transferring the eight bits of a first control word out of the unit, to a processing engine. During the next 40 nanosecond interval, the next stage of the four bit shift register is enabled, thereby allowing a second one of the four AND gates in each of the eight logic stages to transfer a second set of eight bits for a second control word out of the unit to the processing engine. As can be seen, an effective control word output rate of four times the control storage cycle time can be achieved.

The address input to the control store can be incremented by sequentially indexing an address counter, or alternately by reading out an address pointer at the same time that a new column of microinstructions (each containing four control words) is accessed, the address pointer updating the base address for the next column of microinstructions to be accessed from the control store.

DESCRIPTION OF THE FIGURES

These and other objects, features and advantages of the invention will be more fully appreciated with reference to the accompanying figures.

FIG. 6 is a detailed timing diagram of the operation of the multiplier 12 of FIG. 3 and the adder 14 of FIG. 4 when operated under the control of the synchronized microsequencer invention which is especially adapted for this purpose as shown in FIG. 5.

DISCUSSION OF THE PREFERRED EMBODIMENT

Figure 1:
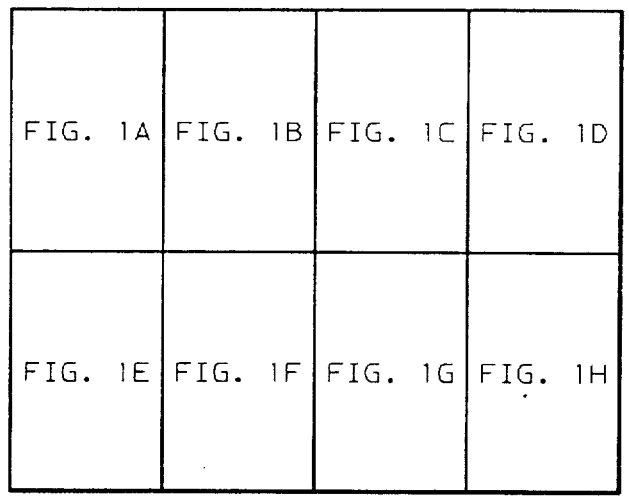
FIG. 1 (which is made up of the component FIGS. 1A-1H) is an overall functional block diagram of the synchronized microsequencer invention.
Figure 1A:
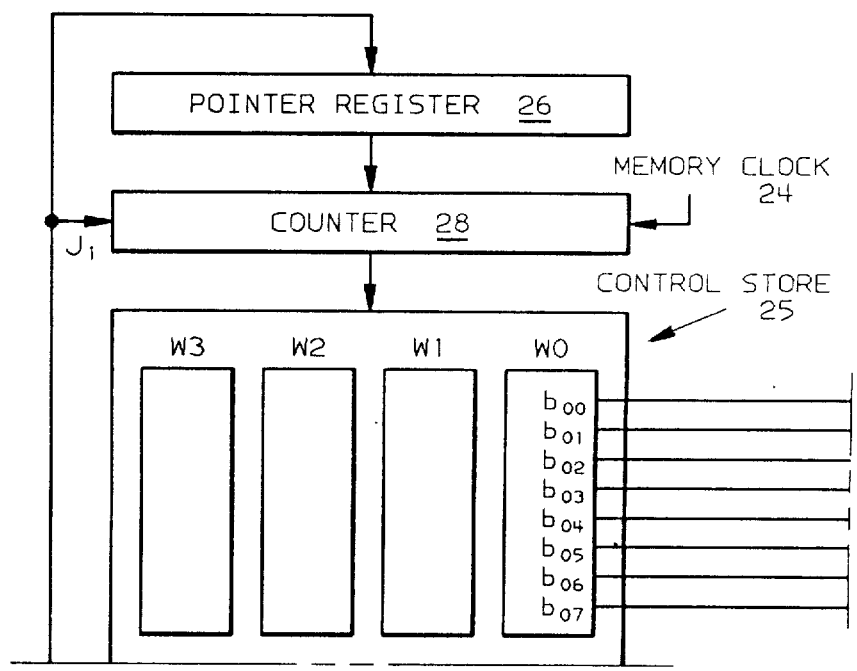
Figure 1B:
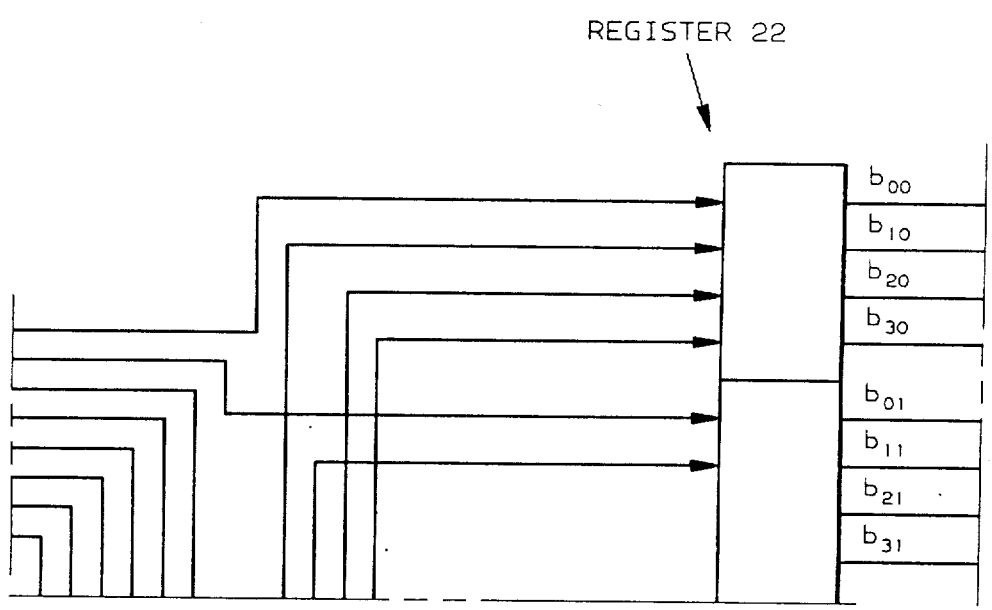
Figure 1C:
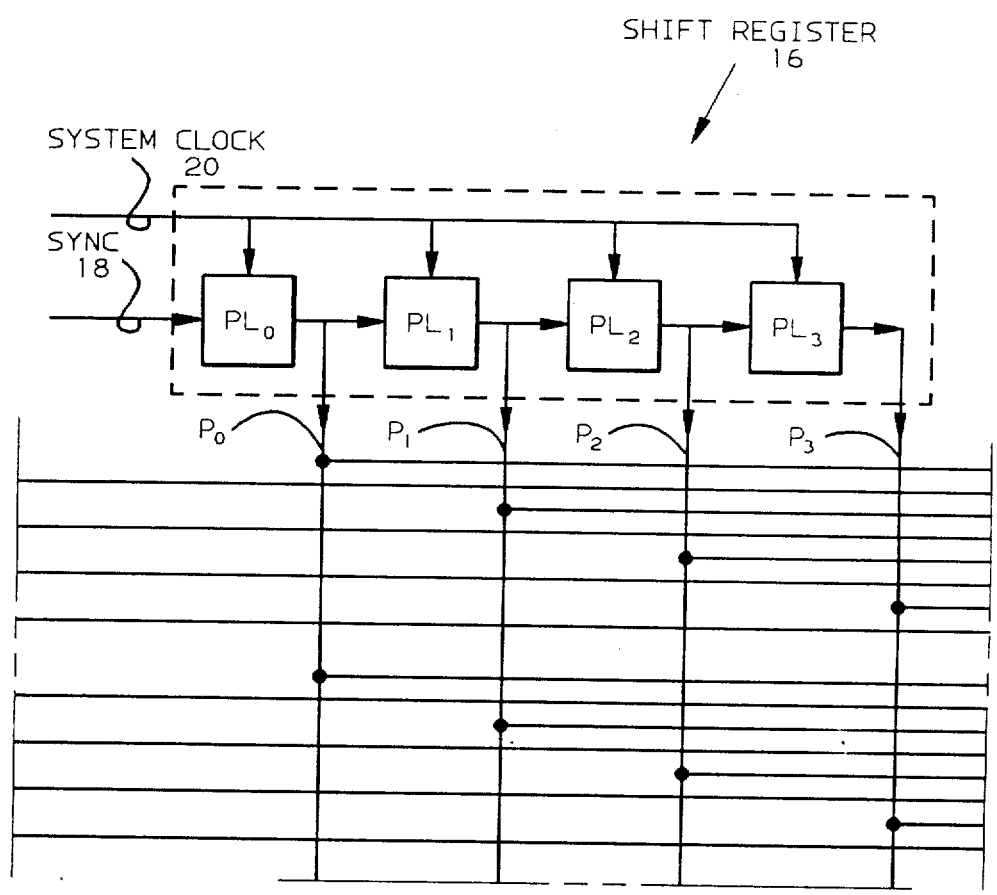
Figure 1D:
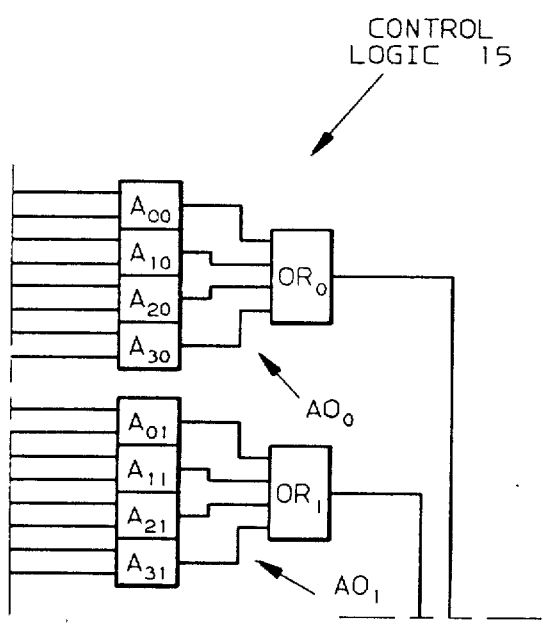
Figure 1E:
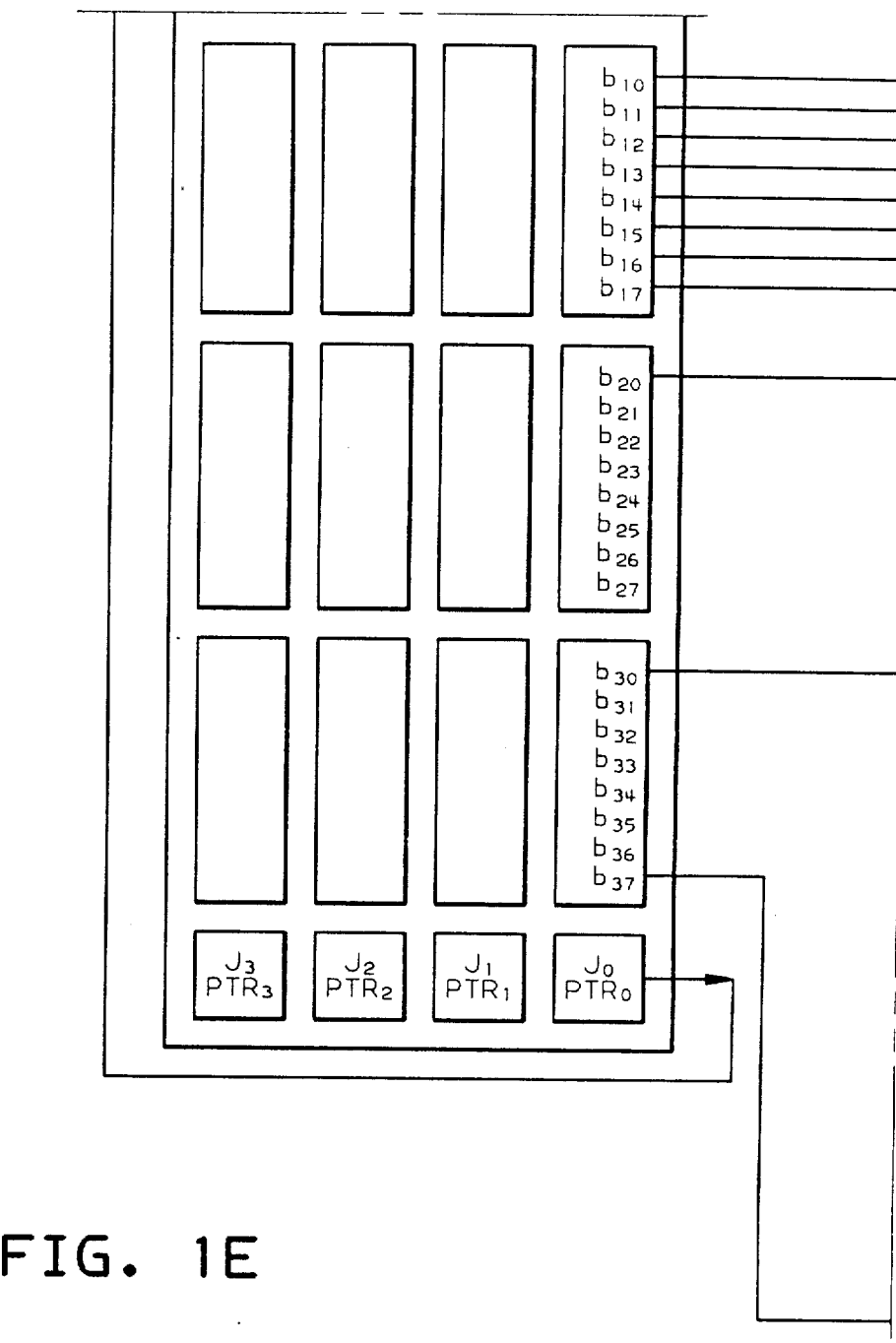
Figure 1F:
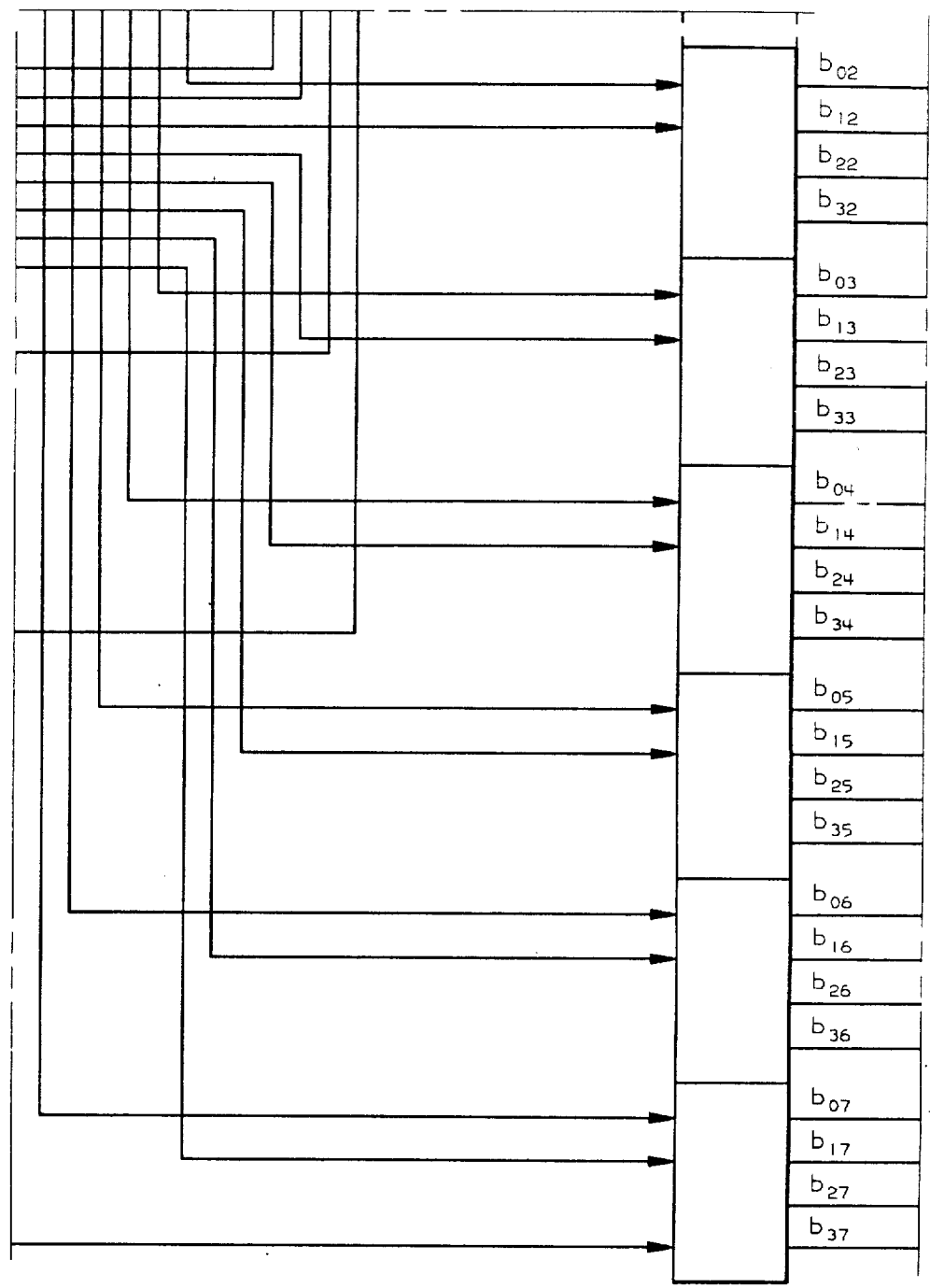
Figure 1G:
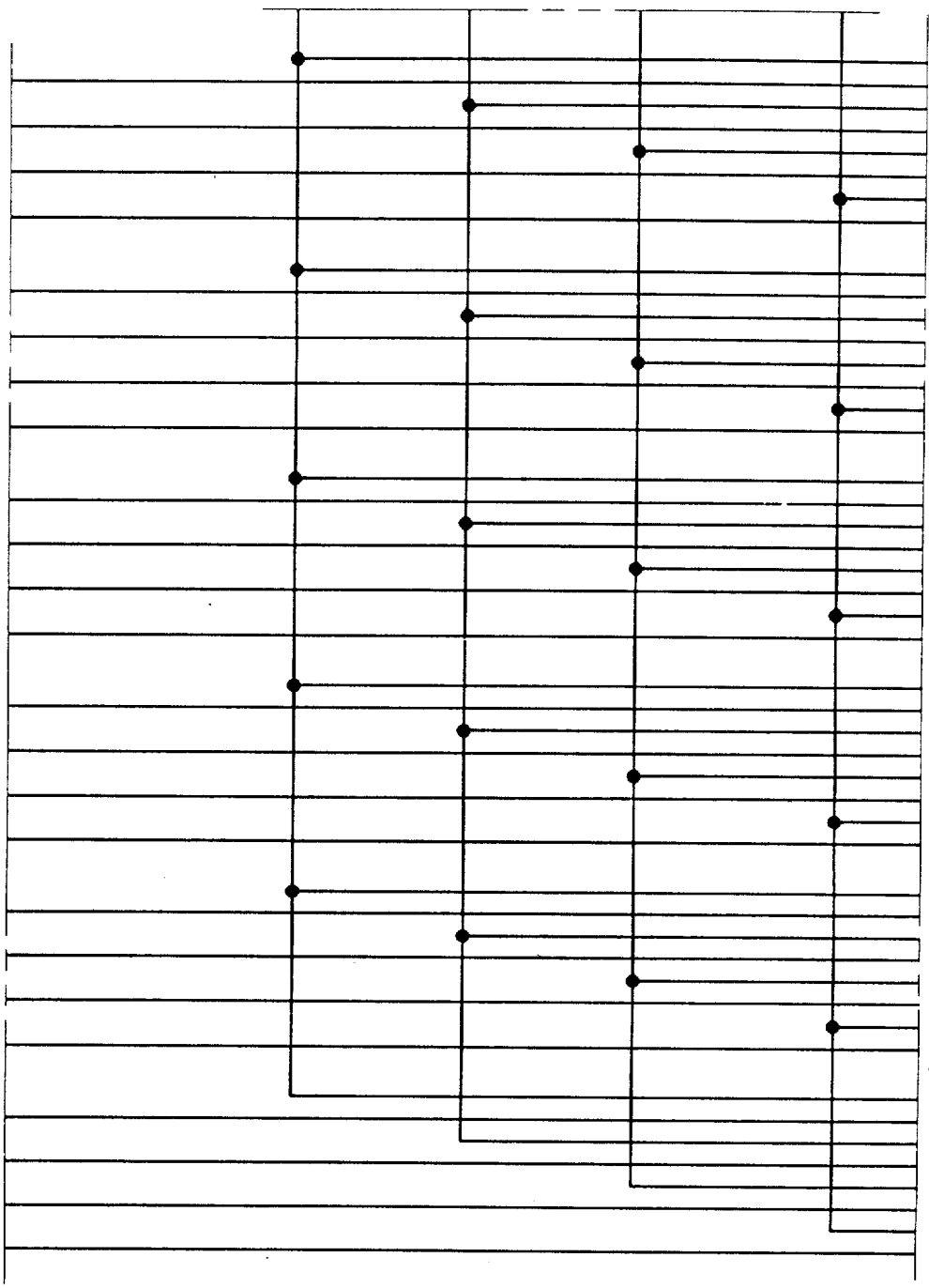
Figure 1H:
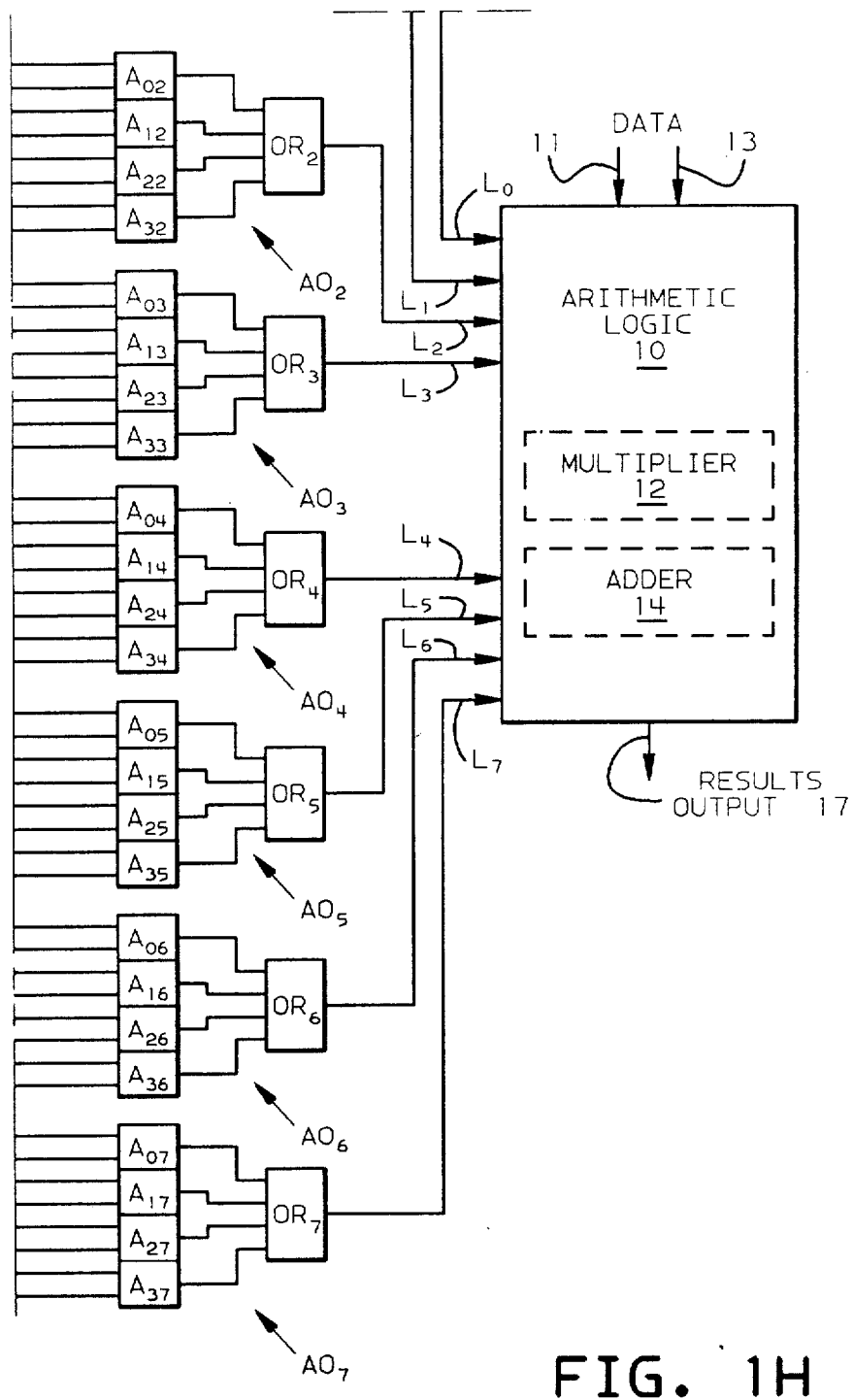
Figure 2:
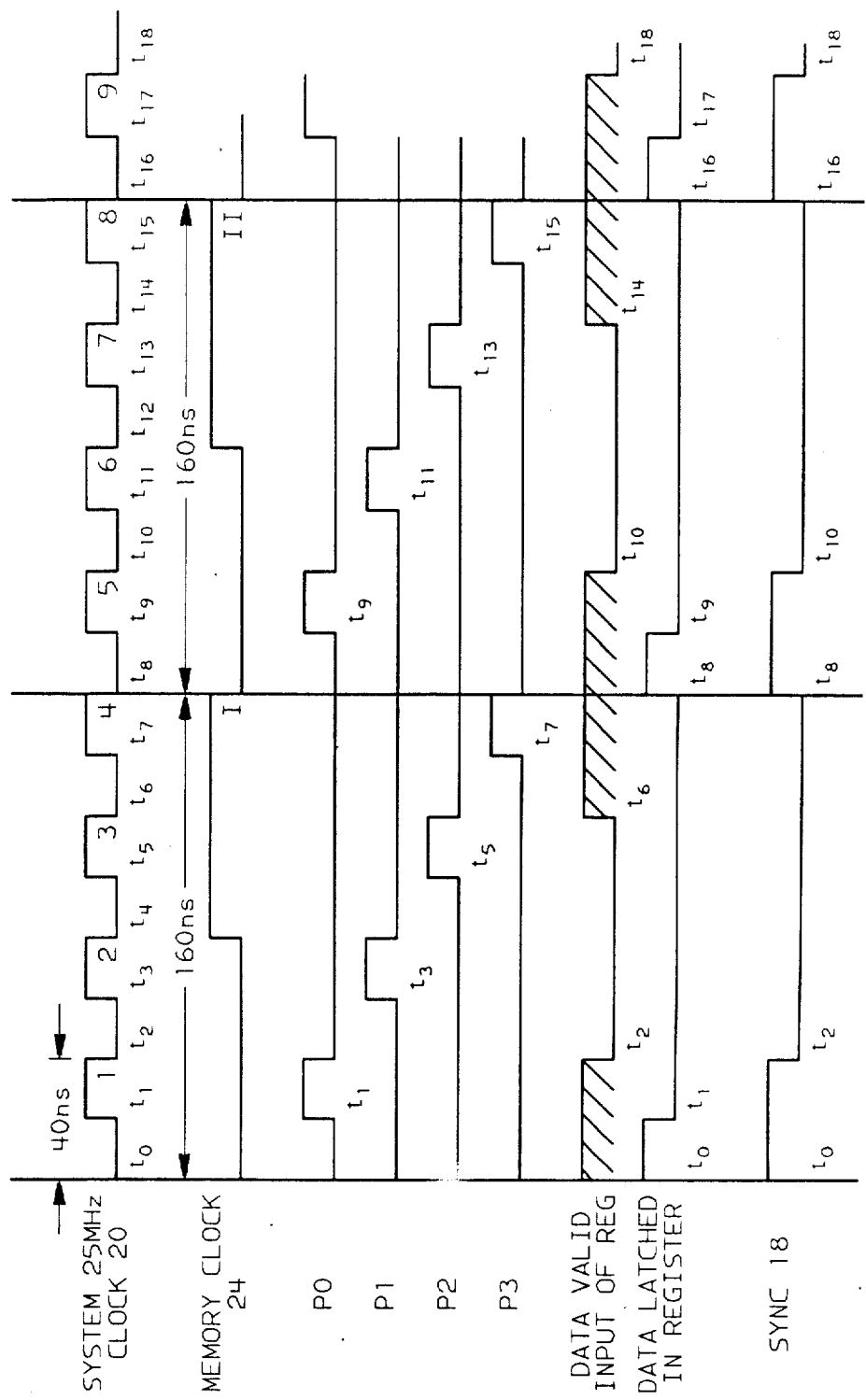
FIG. 2 is a timing diagram of the operation of the invention shown in FIG. 1.

The arithmetic logic 10, the control logic 15, and the control store 25 shown in FIG. 1, can all be formed on a single very large scale integrated circuit chip. The arithmetic logic 10 will carry out arithmetic operations on operands applied at the data inputs 11 and 13 to produce the numerical results output at the results output 17. The arithmetic logic 10 will have a characteristic elementary cycle time which is governed by the system clock 20 whose waveform is shown in FIG. 2. A typical high speed arithmetic logic unit 10 will operate with a system clock of 25 MHz, that is each arithmetic operation will occur within a 40 nanosecond interval. A large variety of arithmetic operations can be performed by arithmetic logic units such as unit 10, such as real multiplies, complex multiplies, signal correlations, fast Fourier transforms, and many other high speed, highly repetitive arithmetic operations.

The control logic 15 must apply control signals over the lines L0 through L7 at the system clock rate of 25 MHz in this example, in order to control the sequential elementary arithmetic functions to be performed by the arithmetic logic 10. For single purpose applications where the arithmetic logic 10 is to perform a single or very limited repertoire arithmetic operations, a single control register 22 can be used to store a single microinstruction. In the example shown in FIG. 1, the microinstruction is 32 binary bits long with the control bits being identified as b00 through b37, organized into four control words.

However, a more general purpose arithmetic logic unit 10 will require a larger number of microinstructions than can be stored in the single microinstruction register 22. For this purpose, the control store 25 is also formed on the same very large scale integrated circuit chip, which contains a plurality of 32 bit microinstructions, in this example, organized in four, eight bit control words plus a pointer word for each microinstruction. Provision can be made for a simple sequential accessing of consecutive microinstructions in the control store 25, or alternately provision can be made for selectively branching from a first sequence of microinstruction words to a second sequence, if desired. Since the access cycle time of writable random access memory control stores such as the control store 25 is typically longer than the 40 nanosecond interval for the system clock 20, the memory clock 24 must have a period which is substantially longer than the system clock 20. In the example shown in FIGS. 1 and 2, the memory clock 24 has a access cycle time of 160 nanoseconds, which is four times longer than the 40 nanosecond cycle time of the system clock 20. It is in this type of application that the synchronized microsequencer invention disclosed herein finds great advantage in that four consecutive, different eight bit control words can be applied to the arithmetic logic 10 during four consecutive 40 nanosecond cycles of the system clock 20 for every single access of a 32 bit microinstruction from the control store 25. Thus, the high speed arithmetic logic unit 10 can have a general purpose, flexible control applied to it from control bits stored in a control store which is accessed at one-fourth the cycle time of the arithmetic logic operations. The way in which the synchronized microsequencer invention carries out this operation is described as follows.

The first illustration of the invention will be that of a limited repertoire arithmetic logic unit 10 requiring a single, 32 bit microinstruction word stored in the register 22 of FIG. 1. Referring to the timing diagram of FIG. 2, the synchronization pulse SYNC 18 is applied between the time t0 and the time t2 to the first stage PL0 of a four stage shift register 16. When the system clock 20 rises between t1 and t2, a binary one value is latched in the phase latch PL0 and a phase 0 signal P0 is output to each of the AND gates A00 through A07 of the AND/OR circuits AO0 through AO7 of the control logic 15. This will gate the control bit b00 through the AND gate A00 and through the OR gate OR0 and over the line L0 to the arithmetic logic unit 10. Correspondingly for all eight of the AND/OR units AO0 through AO7 the respective binary control bits b00 through b07 will be gated through respective AND gates A00 through A07, resulting in the application of the eight binary control signals L0 through L7 to the arithmetic logic unit 10 during the first 40 nanosecond interval between t1 and t2 of the system clock 20.

During the second interval of the system clock 20 between t3 and t4 of FIG. 2, a positive going signal on the system clock line 20 will latch the binary one state at the line P0 into the second phase latch PL1 and will latch the binary zero state which is now at the SYNC line 18, into the first phase latch PL0. This will apply a binary one signal at the output of the second phase latch PL1 on the line P1, which will be applied to the second AND gate in each of the respective AND/OR units AO0 through AO7. This will transfer the binary bit b10 through the AND gate A10 and the OR gate OR0 over the line L0 to the arithmetic logic unit 10. Similarly, for all eight of the AND/OR units AO0 through AO7, the binary bit b10 through b17 will be respectively transferred through the AND gates A10 through A17 and the OR gates OR0 through OR7 so as to result in the application of eight new binary control signals L0 through L7 to the arithmetic logic unit 10 during the second 40 nanosecond interval between t3 and t4 of the system clock 20.

Similarly, during the third 40 nanosecond interval between t5 and t6 in the timing diagram of FIG. 2, the positive going signal on the system clock line 20 will latch the binary one state at P1 into the third phase latch PL2, the binary zero state at P0 into the second phase latch PL1, and the binary zero state on the SYNC line 18 into the first phase latch PL0. The binary one state now present on the third phase line P2 is applied to the third AND gate in each of the respective AND/OR units AO0 through AO7. This will result in the transmission of the binary control bit b20 through the AND gate A20 and the OR gate OR0 so as to be applied on the line L0 to the arithmetic logic unit 10. Similarly, for all eight of the AND/OR units AO0 through AO7, the binary bit b20 through b27 will be respectively applied through the AND gates A20 through A27 and the OR gates OR0 through OR7 so as to be applied on the signal lines L0 through L7 as a new set of eight control signals which are applied to the arithmetic logic unit 10 during the third 40 nanosecond interval between t5 and t6 of the system clock 20.

Next, in the fourth 40 nanosecond interval between t7 and t8 of the system clock 20 of FIG. 2, the binary one value at the node P2 is latched in the fourth phase latch PL3, the binary zero value at the node P1 is latched in the third phase latch PL2, the binary zero value at the node P0 is latched in the second phase latch PL1, and the binary zero on the SYNC line 18 is latched in the first phase latch PL0. In a manner similar to that described above, the binary one value on the fourth phase line P3 is applied to the fourth AND gate in each respective one of the AND/OR units AO0 through AO7. Thus, the binary bit b30 is applied through the AND gate A30 and the OR gate OR0 and over the line L0 to the arithmetic logic unit 10. Similarly, for all eight of the AND/OR units AO0 through AO7, the binary bits b30 through b37 are respectively applied through the AND gates A30 through A37 and the OR gates OR0 through OR7 so as to be applied over the eight lines L0 through L7 to the arithmetic logic unit 10 during the fourth 40 nanosecond interval from t7 to t8 of the system clock 20 of FIG. 2.

Thus it is seen that the 32 binary control bits stored in the control register 22 have been applied in groups of eight binary bits each during each of four consecutive 40 nanosecond cycles of the system clock 20, to thereby control the arithmetic logic unit 10 for four consecutive cycles of the system clock 20.

The second illustration of the invention will be build upon the description in the first illustration above, by adding the requirement that the arithmetic logic unit 10 has a larger repertoire of arithmetic functions which can be performed, for general purpose applications. To enable this greater flexibility, the control store 25 is provided. In this example of FIG. 1, the control store 25 contains a writable random access memory which occupies the same integrated circuit chip as the control logic 15 and the arithmetic logic 10. The control store 25 in this example, contains four microinstructions, each occupying a column labeled W0, W1, W2 and W3, as shown in FIG. 1. Each microinstruction, such as W0, contains the 32 control bits b00 through b37 and in addition, contains a pointer word containing a pointer address PTR0 and a counter enabling bit J0. As is seen with reference to the timing diagram of FIG. 2, the memory clock signal 24 will increment the address counter 28 so as to sequentially access consecutive ones of the microinstructions W0 through W3 once every 160 nanoseconds of the memory clock 24. The intervals during which the data output from the control store 25 is valid at the inputs of the register 22 is shown in FIG. 2, as being from t0 through t2, from t6 to t10, and from t14 to t18. For example, for a first microinstruction access from the control store 25, the binary control bits b00 through b37 are applied to the inputs of the register 22 and are valid from the time t0 to the time t2. The data at the inputs to the register 22 is latched in the register between the time t0 and t1. Thus, by the time the first phase of the system clock 20 goes on from time t1 to t2, the new microinstruction which has been accessed from the control store 25 is present in the register 22.

The pointer word PTR0 in the first microinstruction W0 is also applied during this interval to the input of the pointer register 26 and the enabling bit J0 was applied to the counter 28. If the binary value of J0 is zero, then the counter 28 continues as a simple unitary indexing counter which is incremented by the memory clock 24 so that by the time t6, the counter 28 applies the next sequential memory address to the control store 25, thereby accessing the next sequential microinstruction W1 which will be latched in the register 22 between the time t8 and t9.

Alternately, if a branch in the program sequence is to occur, then during the interval between t0 and t2 when the first microinstruction W0 has been accessed, if the binary value of J0 is one, then the counter 28 is conditioned to accept the value of the pointer PTR0 which passes from the pointer register 26 into the counter 28. For a branching operation, the value of the pointer address PTR0 will point to a different microinstruction in the control store 25 from the next sequential instruction which was to be W1. In this branching example, assume that the pointer value PTR0, when loaded from the pointer register 26 into the counter 28, will point to the out-of-sequence microinstruction W2. Then, during the interval between t6 and t10, the branched-to microinstruction W2 will be accessed from the control store 25 and will be applied to the inputs of the register 22 so that during the interval between t8 and t9, the binary bits b00 through b37 of the branched-to microinstruction W2 will be loaded into the register 22. The binary bits of the branched-to microinstruction W2 will then be read out of the register 22 in four units of eight control binary bits each over the next four intervals of 40 nanoseconds each of the system clock 20, as was described above.

In this manner, it can be seen that great flexibility as well as great speed can be achieved in the control of the arithmetic logic unit 10 by means of the synchronized microsequencer invention disclosed herein.

EXAMPLE

Complex Multiplication

A specific example of an application of the synchronized microsequencer invention will now be made with reference to FIGS. 3, 4, 5 and 6. The operation which will be demonstrated is a complex multiplication of two complex operands, the first operand being a complex number input over the data bus 11 and the second operand is a complex number referred to herein as the coefficient, input over the coefficient bus 13 of FIG. 3. The coefficient is preloaded into the registers R2 and R3 of the multiplier shown in FIG. 3. The values of the coefficient stored in registers R2 and R3 are repeatedly multiplied times consecutive values for the complex operand input over the bus 11.

Each complex number $D_I + jD_Q$ is composed of two components, a real component $D_I$ and an imaginary component $D_Q$. The subscripts I and Q signify that the real component is an in-phase component and the imaginary component is a quadrature component.

Complex multiplication, as described herein, is achieved by performing four real multiplications and two real additions. In order to carry out the particular application described herein, the addition of a complex number will also be carried out and this will require two more addition operations. Thus, four real multiplication operations and four real addition operations are executed in the complex multiplication process described in this example.

It is the purpose of showing this example, to illustrate the control function performed by the synchronized microsequencer control logic 15 of FIG. 1 over four consecutive control cycles. The timing diagram for carrying out the necessary control functions to achieve the complex multiplication operation, is shown in FIG. 6.

Figure 3:
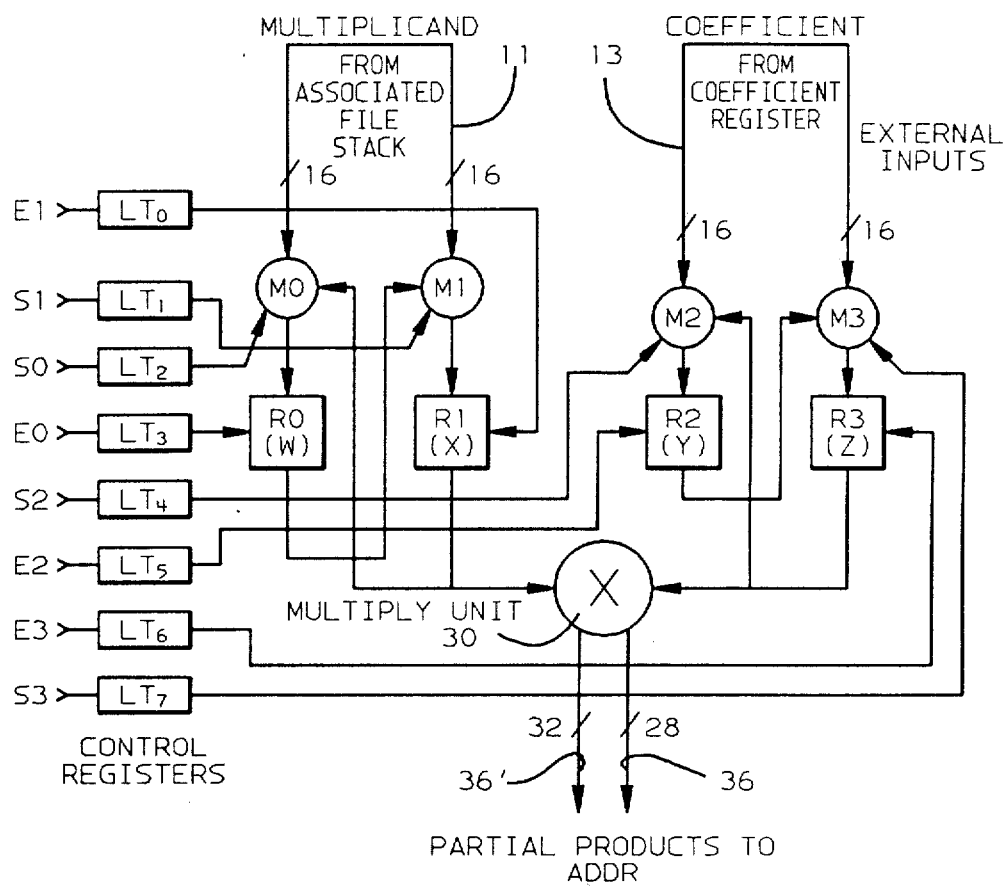
FIG. 3 illustrates a functional block diagram of one embodiment of a multiplier 12 contained in the arithmetic logic 10 of FIG. 1, which can be controlled by the microsequencer invention.
Figure 4:
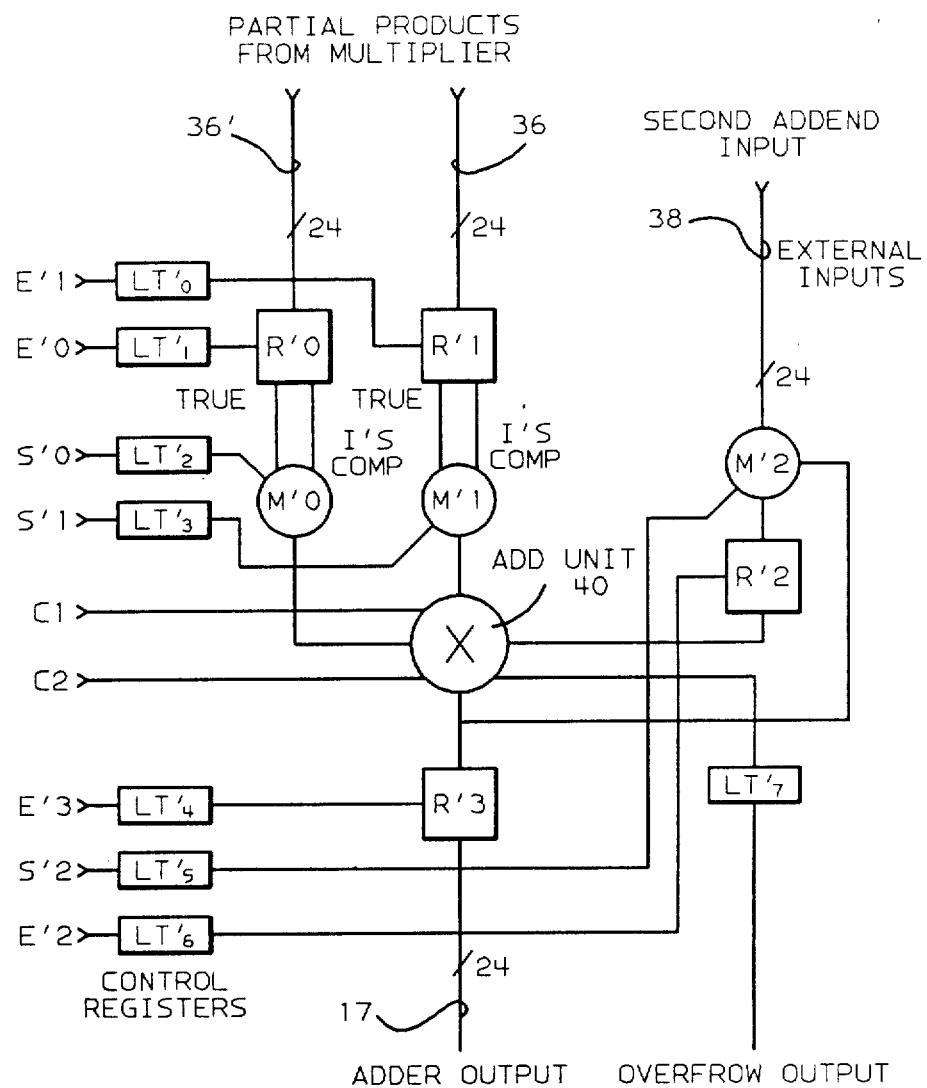
FIG. 4 is a functional block diagram of one embodiment of an adder 14 in the arithmetic logic 10 of FIG. 1, which can be controlled by the synchronized microsequencer invention.
Figure 5:
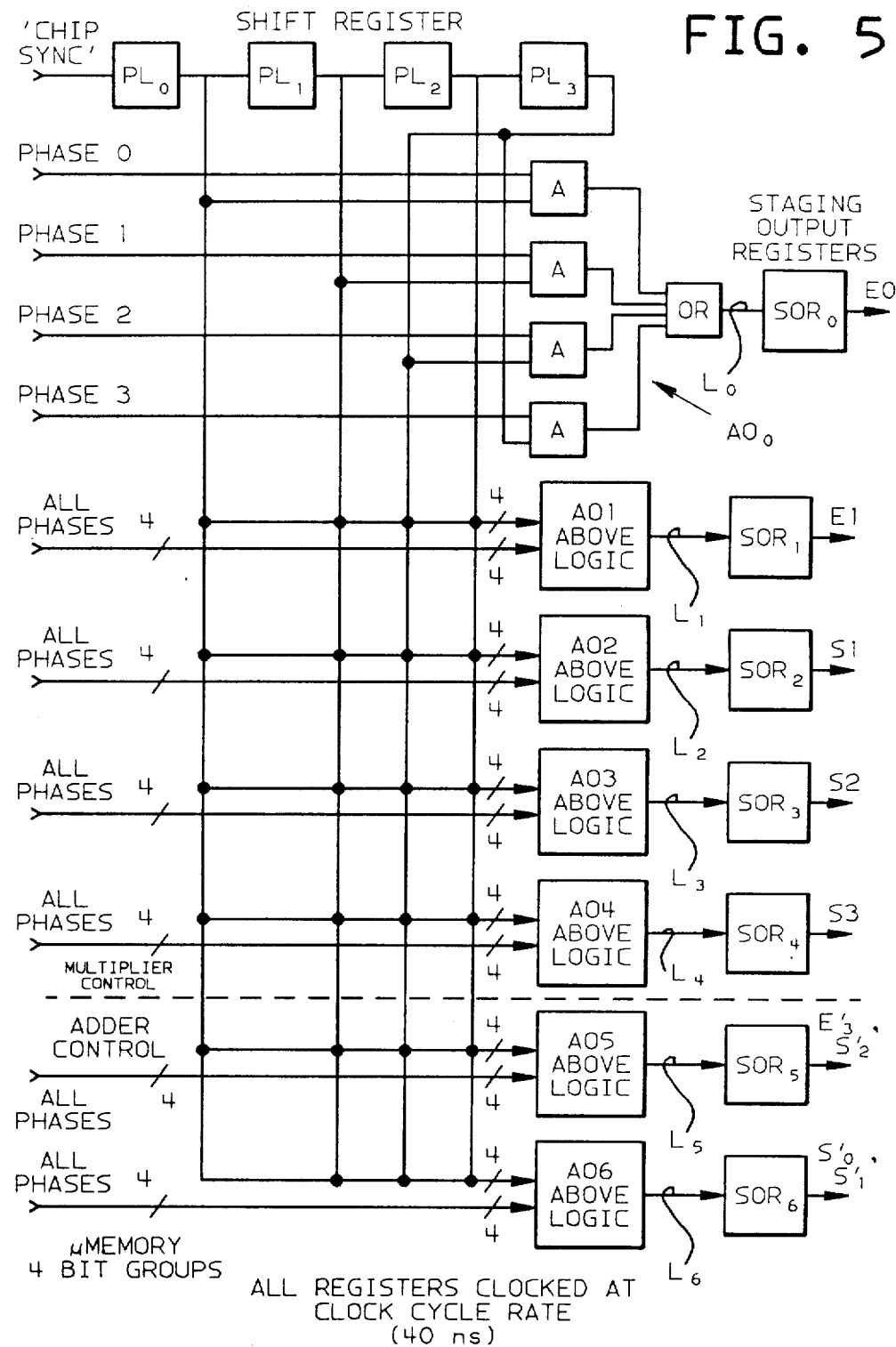
FIG. 5 is a functional block diagram of the shift register and AND/OR logic portion of the microsequencer of FIG. 1, showing a specialized adaptation for controlling the multiplier 12 of FIG. 3 and the adder 14 of FIG. 4.

Seven control signals L0 through L6 are output from the control logic 15 and passed through the respective staging output registers SOR0 through SOR6 of FIG. 5, so as to apply the necessary control signals to the multiplier circuitry shown in FIG. 3 and the adder circuitry shown in FIG. 4. The control lines L0, L1, L2, L3 and L4 output from the control logic 15 are directed to the control inputs of the multiplier 12 of FIG. 3 and the control lines L5 and L6 output from the control logic 15 are applied to the control inputs of the adder 14 of FIG. 4. Table I herein describes the control functions performed by the control signals on the control lines L0 through L4 for the multiplier 12 in FIG. 3. Table II describes the control functions for the control lines L5 and L6 for the adder 14 in FIG. 4.

FIG. 3 shows the multiplier 12 which has the multiply unit 30 which is a 16 bit by 16 bit partial product generator which accepts 16 bit operands for the multiplier and the multiplicand and produces the partial products at its output as is described in the copending U.S. patent application Ser. No. 449,924 filed Dec. 15, 1982 by B. R. Mercy, and assigned to the instant assignee. The multiplicand input is to the coefficient registers R2 and R3 wherein the real and imaginary portions $C_I$ and $C_Q$ of the complex coefficient $C_I+jC_Q$ are stored. The multiplier input to the multiply unit 30 is from the registers R0 and R1 in FIG. 3 which store the real and imaginary portions $D_{I0}$ and $D_{Q0}$ of the complex number $D_{I0}+jD_{Q0}$ representing the data values which are sequentially input over the time divided bus 11. The control inputs to the latches LT0 through LT7 from the control lines L0, L1, L2, L3 and L4 of the control logic 15, control the multiplexers M0, M1, M2 and M3 and the registers R0 and R1, as shown in Table I, so that the contents of the registers R0 and R1 can be selectively loaded from the bus 11, or the registers R0 and R1 can be paired with the contents of one loading the other. Similarly, these control inputs selectively provide for pairing R2 and R3 or alternately loading R2 and R3 from the bus 13. The multiplier 12 of FIG. 3 is a pipelined multiplier which requires different connections between the data bus 11 and the registers R0 and R1 during each consecutive control cycle, and these alternate paths are implemented by the control inputs to the multiplexers M0 and M1. Table III and the timing diagram of FIG. 6 illustrate the sequence of control steps necessary to carry out the component operations over four consecutive control cycles which are necessary to produce the partial product outputs on the outputs 36 and 36' these being necessary to produce the complex multiplication.

In performing a complex multiplication of $(C_I+jC_Q)$ times $D_{I0}+jD_{Q0})$ during the four consecutive cycles shown in FIG. 6 and in Table III, four real products are executed. Since the multiplier 12 of FIG. 3 operates on a pipelined basis, reference must be made to the timing diagram of FIG. 6 to understand when each respective arithmetic step takes place. To carry out the complex multiplication, the real part of the data $D_{I0}$ and the real part of the coefficient $C_I$ are multiplied together during cycle 3 of FIG. 6, by taking the contents of register R1 and multiplying that by the contents of register R3. Reference can be made to Table III under the column entitled Cycle 3 for the pattern of binary bits which are applied on lines L0 through L4 to carry out this step. Reference to FIG. 1 will show that the enabling bit in the shift register 16 will be at the phase latch 3 so that during cycle 3, an enabling signal will be present on the line P3 applying the appropriate control bits from the register 22 as the control signals on lines L0 through L6 as is shown in Table III. It will of course be appreciated that there are equal time delays along each of the data paths from the register 22 over the respective control lines L0 through L6 to the multiplier of FIG. 3 and the adder of FIG. 4, so that the actual reading out of the values from the register 22 occurred several cycles previously and the control signals in the control path are effectively pipelined as well.

In a similar manner, during the next cycle 0', the imaginary part of the data $D_{Q0}$ is multiplied times the imaginary part of the coefficient $C_Q$ in the multiplier 12 of FIG. 3 by means of the control signals shown in Table III and in FIG. 6. Those control signals on the lines L0 through L6 are applied from the control logic 15 in response to the enabling bit being present in the phase latch PL0 of the shift register 16.

In a similar manner, during the next cycle 1', the imaginary part of the data $D_{Q0}$ is multiplied times the real part of the coefficient $C_I$ under the control of the binary bits L0 through L4 as is shown in Table III and FIG. 6. During this cycle, the enabling bit is present in the phase latch PL1 of the shift register 16 for the control logic 15.

Finally, the real part of the data $D_{I0}$ is multiplied times the imaginary part of the coefficient $C_Q$ during cycle 2' as is shown in Table III and in FIG. 6. During cycle 2', the enabling bit is present in the phase latch PL2 of the shift register 16 in the control logic 15 of FIG. 1.

In this manner, the control logic 15 of FIG. 1 is able to sequentially control the operations of the multiplier 12 in FIG. 3.

In a similar manner, the adder 14 of FIG. 4 has its addend and augend inputs connected on lines 36 and 36' to the partial product outputs of the multiplier 12 of FIG. 3. The reference to FIG. 4 will show that the control inputs to latches LT'0 through LT'6 are connected to the control lines L5 and L6 as is shown in Table II. The partial products are sequentially applied over the lines 36 and 36' to the registers R0' and R1' of the adder 14 of FIG. 4, and are then sequentially applied to the inputs of the add unit 40, which is a three-way carry save adder. In a manner similar to that described above for the multiplier 12, the adder 14 is sequentially controlled in accordance with the control bit shown in Table III in a time sequential manner as is shown in the timing diagram of FIG. 6, to carry out the sequential addition of the partial products from the inputs 36 and 36' so that the final output sum on output line 17 is the resultant complex multiplication product produced by the arithmetic logic 10.

Real components of the two complex partial products to be added, are added during cycle 0'. Next, the imaginary components of the two complex partial products are subtracted from the sum generated during cycle 0', to get the real part of the final result to be output on line 17 during cycle 1'. Then, the imaginary part of the final result is added in the adder during cycles 2' and 3' and output on line 17. The second addend input 38 supplies another complex number $A_{I0}+jA_{Q0}$ which is to be added to the complex product discussed above.

In this manner, the control logic 15 controls the sequential operation of the multiplier 12 and the adder 14 over consecutive control cycles, which occur at a faster rate than the memory cycle time for the control store 25.

TABLE I

Multiplier Control Signals

| | Signal | Function |
|---|---|---|
| Micro Code | L0(E0) | Enable Reg 0 ('1' Will Enable) |
| | L1(S1) | Select Reg 1 ('0'External 11, '1' Pair) |
| | L2(E1) | Enable Reg 1 ('1' Will Enable) |
| | L3(S2) | Select Reg 2 ('0' External 13, '1' Pair) |
| | L4(S3) | Select Reg 3 ('0' External 13, '1' Pair) |
| Static | (S0) | Select Reg 0 ('0' External, '1' Pair) In Micro-Code Register |
| Wired | (E2,E3) | '1' - Active Level |

Multiplier in FIG. 3

TABLE II

Adder Control Signals

| | Signal | Function |
|---|---|---|
| Micro-Coded | L6(S0',S1') | True or (1's) Complement of R0 and R1 (0 - True, '1's Complement). |
| | L5(E3',S2') | In all analyses these two signals followed identical sequences. ('0' - Enable Reg 3, Select Addend Input (38) for Reg 2), ('1' - Disable Reg 3, Select Internal Feedback for Reg 2). |
| Wired | (E0',E1',E2') | '1' - Always enabled. |

Adder in FIG. 4

TABLE III

Control for Complex Multiply

| | | | Cycle 0 or 0' | Cycle 1 or 1' | Cycle 2 or 2' | Cycle 3 or 3' |
|---|---|---|---|---|---|---|
| L0 | E0 | MULTI- | $b_{00} = 0$ | $b_{10} = 1$ | $b_{20} = 0$ | $b_{30} = 0$ |
| L1 | S1 | PLIER | $b_{01} = 0$ | $b_{11} = 1$ | $b_{21} = 1$ | $b_{31} = 0$ |
| L2 | E1 | ADDER | $b_{02} = 0$ | $b_{12} = 1$ | $b_{22} = 1$ | $b_{32} = 1$ |
| L3 | S2 | | $b_{03} = 1$ | $b_{13} = 1$ | $b_{23} = 1$ | $b_{33} = 1$ |
| L4 | S3 | | $b_{04} = 1$ | $b_{14} = 1$ | $b_{24} = 1$ | $b_{34} = 1$ |
| L5 | E3',S2' | | $b_{05} = 1$ | $b_{15} = 0$ | $b_{25} = 1$ | $b_{35} = 0$ |
| L6 | S0',S1' | | $b_{06} = 0$ | $b_{16} = 1$ | $b_{26} = 0$ | $b_{36} = 0$ |

$b_{00}$ - $b_{36}$ - Register 22 (FIG. 1) Outputs

The invention accomplishes a significant speeding up of the effective cycle time of the control memory, especially a control memory which exists on the same large scale integrated circuit chip as the processing engine making use of the microinstructions. For example, a four fold increase in the effective cycle time of a microinstruction sequencer has been achieved by using a four bit shift register and outputting four control words per control store access.

Although a specific embodiment of the invention has been disclosed, it will be understood by those of skill in the art that the foregoing and other changes in form and details may be made therein without departing from the spirit and the scope of the invention.

I claim:

1. A high speed microinstruction sequencer for sequentially generating a plurality of N control words during a period, each control word having a plurality of M bits, comprising:

an N bit shift register having N sequential outputs and a clock input with a cycle time equal to 1/N of said period, for propagating a binary bit therethrough to sequentially provide an enabling bit to each of said respective N outputs thereof;

a plurality of M logic stages, each said stage including a plurality of N AND gates, and each of said AND gates having a first and second input, an $i^{th}$ one of said N AND gates in each said stage having a first input connected to an $i^{th}$ one of said N outputs of said shift register;

a control storage means having a plurality of storage locations containing at least said N control words, having a plurality of M times N output lines respectively connected to said second input of each of said AND gates in said M logic stages;

whereby each of said M bit control words can be sequentially output during said period.

2. The apparatus of claim 1, which further comprises:
said control storage having a plurality of columns of storage locations, each said column containing at least said N control words, said control storage having a cycle time which is longer than 1/N of said period.

3. The apparatus of claim 2, which further comprises:
each of said columns in said control storage further including a pointer word for modifying the next address of the column of said control words to be accessed during the next period.

4. A high speed, integrated circuit microprocessor including a microinstruction sequencer for sequentially generating a plurality of N control words during a period, each control word having a plurality of M bits, comprising:

a storage register in said integrated circuit, having a plurality of M times N storage locations, for storing a microinstruction containing said N control words;

an N shift register in said integrated circuit, having N sequential outputs and a clock input with a cycle time equal to 1/N of said period, for propagating a binary bit therethrough to sequentially provide an enabling bit to each of said respective N outputs thereof;

a plurality of M logic stages in said integrated circuit, each said stage including a plurality of N AND gates, and each of said AND gates having a first and a second input, an $i^{th}$ one of said N AND gates in each said stage having a first input connected to an $i^{th}$ one of said N outputs of said shift register;

said storage register having a plurality of M times N output lines respectively connected to said second input of each of said AND gates in said M logic stages;

whereby said plurality of N of said control words can be sequentially output during said period.

5. The apparatus of claim 4, which further comprises:
a control storage in said integrated circuit, having a plurality of microinstructions, each said microinstruction containing at least said N control words, having a plurality of M times N output lines, each respectively connected to one of said storage locations in said storage register, said control storage having a cycle time which is longer than 1/N of said period, for sequentially outputting one of said microinstructions every said period.

6. The apparatus of claim 5, which further comprises:
an address counter in said integrated circuit, having an output connected to an address input of said control storage, for sequentially incrementing an address value during every said period for accessing the next one of said plurality of microinstructions stored in said control storage.

7. The apparatus of claim 6, which further comprises:
each of said microinstructions in said control storage further including a pointer word for modifying the next address of the microinstructions to be accessed during the next period;

a pointer register in said integrated circuit, having an input connected to an output of said control storage and an output connected to an input of said address counter, for receiving said pointer word in said microinstructions accessed from said control storage;

each of said microinstructions in said control storage further including a pointer enabling bit for indicating that the next address to be applied by said address counter to access said control storage is said pointer word;

said address counter having an enabling input connected to said pointer enabling bit output of said control storage, for enabling said address counter to load said pointer word therein as the next address for accessing said control storage.

8. A high speed, field effect transistor, integrated circuit microprocessor including a microinstruction sequencer for sequentially generating a plurality of N control words during a period, each control word having a plurality of M bits, comprising:

a field effect transistor control storage in said integrated circuit, having a plurality of microinstructions, each said microinstruction containing at least said N control words, having a plurality of M times N output lines, said control storage having a cycle time which is longer than 1/N of said period, for sequentially outputting one of said microinstructions every said period;

a storage register in said integrated circuit, having a plurality of M times N storage locations, each having an input respectively connected to one of said output lines of said control storage, for storing each consecutive microinstruction output from said control storage;

an N bit shift register in said integrated circuit, having N sequential outputs and a clock input with a cycle time equal to 1/N of said period, for propagating a binary bit therethrough to sequentially provide an enabling bit to each of said respective N outputs thereof;

a plurality of M logic stages in said integrated circuit, each said stage including a plurality of N AND gates, and each of said AND gates having a first and a second input, an $i^{th}$ one of said N AND gates in each said stage having a first input connected to an $i^{th}$ one of said N outputs of said shift register and a second input connected to a respective one of said M control bits in a respective one of said N control words of the microinstruction stored in said storage register;

whereby said plurality of N of said control words can be sequentially output for every one of said microinstructions accessed from said control storage during said period.

9. The apparatus of claim 8, which further comprises:

an address counter in said integrated circuit, having an output connected to an address input of said control storage, for sequentially incrementing an address value during every said period for accessing the next one of said plurality of microinstructions stored in said control storage.

10. The apparatus of claim 9, which further comprises:

each of said microinstructions in said control storage further including a pointer word for modifying the next address of the microinstructions to be accessed during the next period;

a pointer register in said integrated circuit, having an input connected to an output of said control storage and an output connected to an input of said address counter, for receiving said pointer word in said microinstructions accessed from said control storage;

each of said microinstructions in said control storage further including a pointer enabling bit for indicating that the next address to be applied by said address counter to access said control storage is said pointer word;

said address counter having an enabling input connected to said pointer enabling bit output of said control storage, for enabling said address counter to load said pointer word therein as the next address for accessing said control storage.

11. The apparatus of claim 8, wherein said control storage is a field effect transistor read only memory in said integrated circuit.

12. The apparatus of claim 8, wherein said control storage is a field effect transistor writable random access memory in said integrated circuit.

* * * * *